(12) United States Patent
Ikuno

(10) Patent No.: US 11,772,431 B2
(45) Date of Patent: Oct. 3, 2023

(54) PNEUMATIC TIRE

(71) Applicant: Toyo Tire Corporation, Itami (JP)

(72) Inventor: Yusuke Ikuno, Itami (JP)

(73) Assignee: Toyo Tire Corporation, Itami (JP)

( * ) Notice: Subject to any disclaimer, the term of this patent is extended or adjusted under 35 U.S.C. 154(b) by 54 days.

(21) Appl. No.: 17/473,289

(22) Filed: Sep. 13, 2021

(65) Prior Publication Data

US 2022/0097455 A1 Mar. 31, 2022

(30) Foreign Application Priority Data

Sep. 30, 2020 (JP) .................................. 2020-164464

(51) Int. Cl.
| | |
|---|---|
| B60C 11/12 | (2006.01) |
| B60C 11/11 | (2006.01) |
| B60C 11/13 | (2006.01) |
| B60C 11/03 | (2006.01) |

(52) U.S. Cl.
CPC .......... B60C 11/1281 (2013.01); B60C 11/11 (2013.01); B60C 11/1204 (2013.01); B60C 11/1236 (2013.01); B60C 11/1369 (2013.01); B60C 2011/0358 (2013.01); B60C 2011/0381 (2013.01); B60C 2011/1213 (2013.01)

(58) Field of Classification Search
CPC . B60C 11/1236; B60C 11/11; B60C 11/1376; B60C 2011/133; B60C 11/12
See application file for complete search history.

(56) References Cited

U.S. PATENT DOCUMENTS

| | | | | |
|---|---|---|---|---|
| D384,918 S | * | 10/1997 | Guspodin | ........... B60C 11/0309 |
| | | | | D12/595 |
| 2004/0238092 A1 | * | 12/2004 | Colombo | ............ B60C 11/1384 |
| | | | | 152/209.15 |
| 2017/0274708 A1 | | 9/2017 | Suzuki et al. | |
| 2018/0297416 A1 | * | 10/2018 | Ninomiya | ........... B60C 11/1204 |
| 2018/0333993 A1 | * | 11/2018 | Fujimoto | ................ B60C 11/01 |

(Continued)

FOREIGN PATENT DOCUMENTS

| | | | | |
|---|---|---|---|---|
| EP | 2586626 A1 | * | 5/2013 | ......... B60C 11/0306 |
| JP | 2016107918 A | * | 6/2016 | .............. B60C 11/11 |
| JP | 6657959 A | | 3/2020 | |

OTHER PUBLICATIONS

JP 2016-107918 Machine Translation; Todoroki, Daisuke (Year: 2016).*

*Primary Examiner* — Robert C Dye
*Assistant Examiner* — Nicholas J Weiler
(74) *Attorney, Agent, or Firm* — WHDA, LLP

(57) ABSTRACT

A pneumatic tire includes a block defined by first and second main grooves and first and second lateral grooves, wherein the block includes a slit having one end open to the first main groove and the other end terminating in the block, a first corrugated sipe having one end open to the first main groove and the other end terminating in the block, and a second corrugated sipe having one end open to the second main groove and the other end terminating in the block, the slit includes a notch groove and a center sipe, the center sipe includes a first portion extending from the notch groove toward the second main groove, and a second portion bent and extending from a terminal end of the first portion, and the first and second corrugated sipe are disposed in the tire circumferential direction across the center sipe.

8 Claims, 4 Drawing Sheets

(56) References Cited

U.S. PATENT DOCUMENTS

| | | | |
|---|---|---|---|
| 2019/0054769 A1* | 2/2019 | Hoshino | B60C 11/0309 |
| 2019/0184762 A1* | 6/2019 | Wada | B60C 11/1369 |
| 2021/0086563 A1* | 3/2021 | Yoshida | B60C 11/1272 |

* cited by examiner

PNEUMATIC TIRE

BACKGROUND OF THE INVENTION

Field of the Invention

The present disclosure relates to a pneumatic tire.

Description of the Related Art

Patent Document 1 below discloses a pneumatic tire capable of improving braking performance on a snowy road surface in addition to braking performance on a dry road surface and a wet road surface. In this pneumatic tire, a block defined and formed by a first circumferential groove, a second circumferential groove, and an auxiliary groove has sipes that communicate with the first circumferential groove and terminate in the block and are formed as a pair of two sipes. An edge effect is improved by the two sipes, so that the braking performance on the snowy road surface can be improved.

However, in the pneumatic tire of Patent Document 1, any two sipes extend from the first circumferential groove toward the second circumferential groove with respect to one block, and it cannot be said that the block has good stiffness balance in the tire width direction. When the block has poor stiffness balance, for example, irregular wear increases, and noise after wear increases.

PRIOR ART DOCUMENT

Patent Document

Patent Document 1: JP-B2-6657959

SUMMARY OF THE INVENTION

An object of the present disclosure is to provide a pneumatic tire capable of optimizing a stiffness balance of a block.

A pneumatic tire according to the present disclosure includes: first and second main grooves that are extending in a tire circumferential direction; first and second lateral grooves that are extending in a direction inclined with respect to a tire width direction and are connected to the first and second main grooves; and a block defined by the first and second main grooves and the first and second lateral grooves. The block includes a slit that has one end open to the first main groove and the other end terminating in the block, a first corrugated sipe that has one end open to the first main groove and the other end terminating in the block, and a second corrugated sipe that has one end open to the second main groove and the other end terminating in the block. The slit includes a notch groove open to the first main groove, and a center sipe connected to the notch groove. The center sipe includes a first portion extending from the notch groove toward the second main groove, and a second portion bent and extending from a terminal end of the first portion. The first corrugated sipe and the second corrugated sipe are disposed in the tire circumferential direction across the center sipe.

DETAILED DESCRIPTION OF THE PREFERRED EMBODIMENTS

Figure 1:
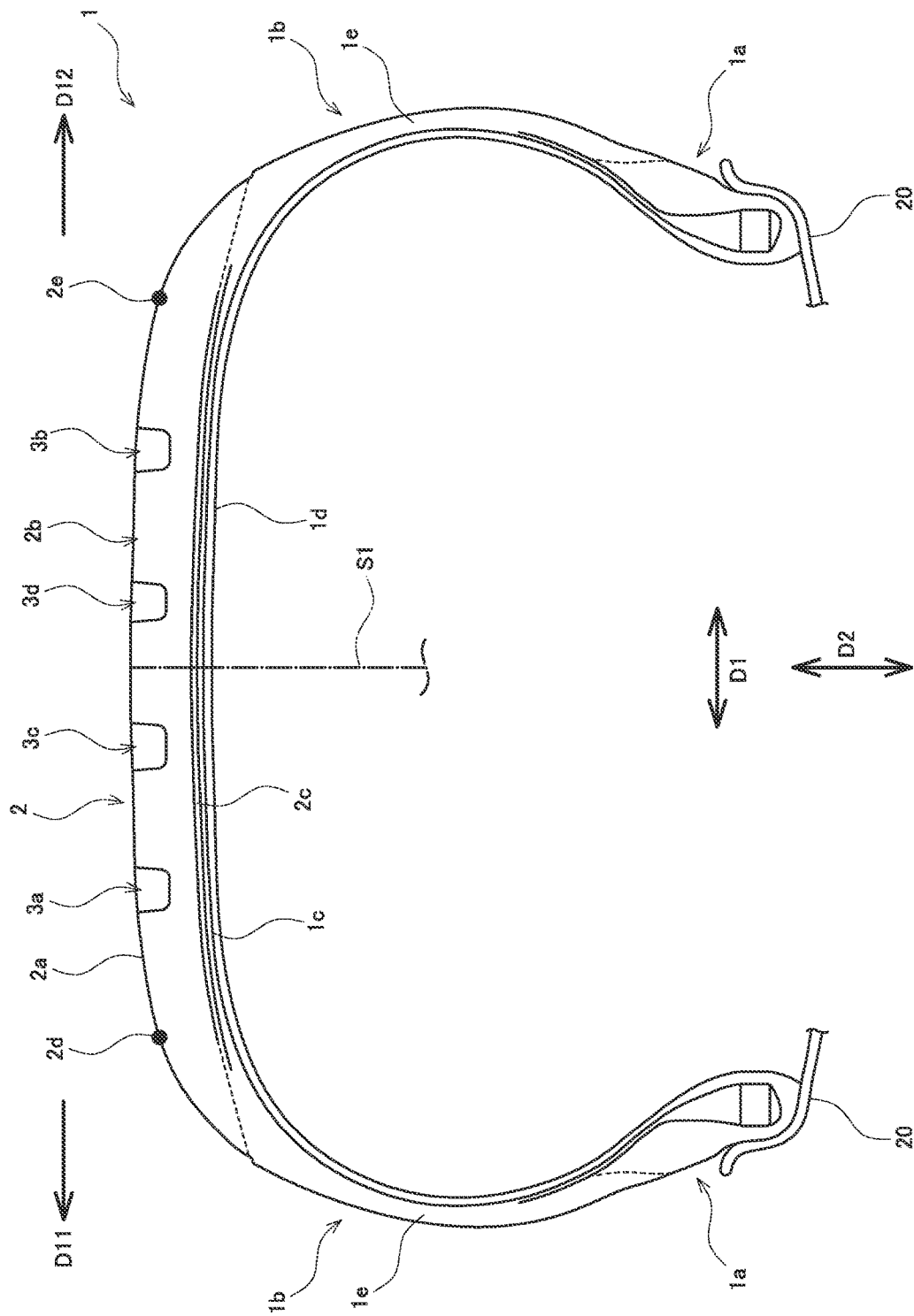
FIG. 1 is a cross-sectional view of a main part of a pneumatic tire according to an embodiment on a tire meridian plane.

Hereinafter, an embodiment of a pneumatic tire will be described with reference to FIGS. 1 to 4. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire width direction D1 parallel to a tire rotation shaft that is a rotation center of a pneumatic tire (hereinafter, also simply referred to as a "tire") 1, a second direction D2 is a tire radial direction D2 being a diameter direction of the tire 1, and a third direction D3 is a tire circumferential direction D3 around the tire rotation shaft.

In the tire width direction D1, the inner side is a side close to a tire equatorial plane S1, and the outer side is a side far from the tire equatorial plane S1. In the tire width direction D1, a first side D11 is also referred to as a first width direction side D11, and a second side D12 is also referred to as a second width direction side D12. In the tire radial direction D2, the inner side is a side close to the tire rotation shaft, and the outer side is a side far from the tire rotation shaft.

The tire equatorial plane S1 is a plane orthogonal to the tire rotation shaft and located at the center of the tire 1 in the tire width direction D1, and the tire meridian plane is a plane including the tire rotation shaft and orthogonal to the tire equatorial plane S1. The tire equatorial line is a line along which an outer surface (a tread surface 2a to be described later) of the tire 1 in the tire radial direction D2 intersects with the tire equatorial plane S1.

As illustrated in FIG. 1, the tire 1 according to the present embodiment includes a pair of beads 1a having a bead core, sidewalls 1b extending outward in the tire radial direction D2 from the respective beads 1a, and a tread 2 connected to the outer ends of the pair of sidewalls 1b in the tire radial direction D2 and having the outer surface in the tire radial direction D2 which comes into contact with a road surface. In the present embodiment, the tire 1 is a pneumatic tire 1, into which air is pumped, and is mounted on a rim 20.

Further, the tire 1 includes a carcass 1c stretched between a pair of bead cores, and an inner liner 1d disposed inside the carcass 1c and having an excellent function of preventing permeation of gas in order to maintain the air pressure. The carcass 1c and the inner liner 1d are disposed along the tire inner circumference over the bead 1a, the sidewall 1b, and the tread 2.

The tread 2 includes a tread rubber 2b having a tread surface 2a that comes into contact with the road surface, and a belt 2c disposed between the tread rubber 2b and the carcass 1c. The tread surface 2a has a ground-contacting surface that actually comes into contact with the road surface, and the outer ends of the ground-contacting surface in the tire width direction D1 are referred to as ground-contacting ends 2d, 2e. Note that the ground-contacting surface refers to a tread surface 2a that comes into contact with a flat load surface when the tire 1 is assembled with the normal rim 20, the tire 1 is placed on the road surface perpendicularly thereto in a state where the tire 1 is filled with normal internal pressure, and a normal load is applied.

In a standard system including a standard on which the tire 1 is based, the normal rim 20 is a rim 20 defined for each tire 1 by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organisation (ETRTO).

The normal internal pressure is air pressure defined for each tire 1 by each standard in the standard system including the standard on which the tire 1 is based. The normal internal pressure is the maximum air pressure in the case of JATMA, the maximum value described in Table "TIRE LOAD LIMITS AT VARIOUS COLD INFLATION PRESSURES" in the case of TRA, and "INFLATION PRESSURE" in the case of ETRTO, and, when the tire 1 is for a passenger car, the normal internal pressure is set to 180 kPa.

The normal load is a load defined for each tire 1 by each standard in the standard system including the standard on which the tire 1 is based. The normal load is the maximum load capacity in the case of JATMA, the maximum value described in the above table in the case of TRA, and "LOAD CAPACITY" in the case of ETRTO, and, when the tire 1 is for a passenger car, the normal load is 85% of the corresponding load of the internal pressure of 180 kPa.

Figure 2:
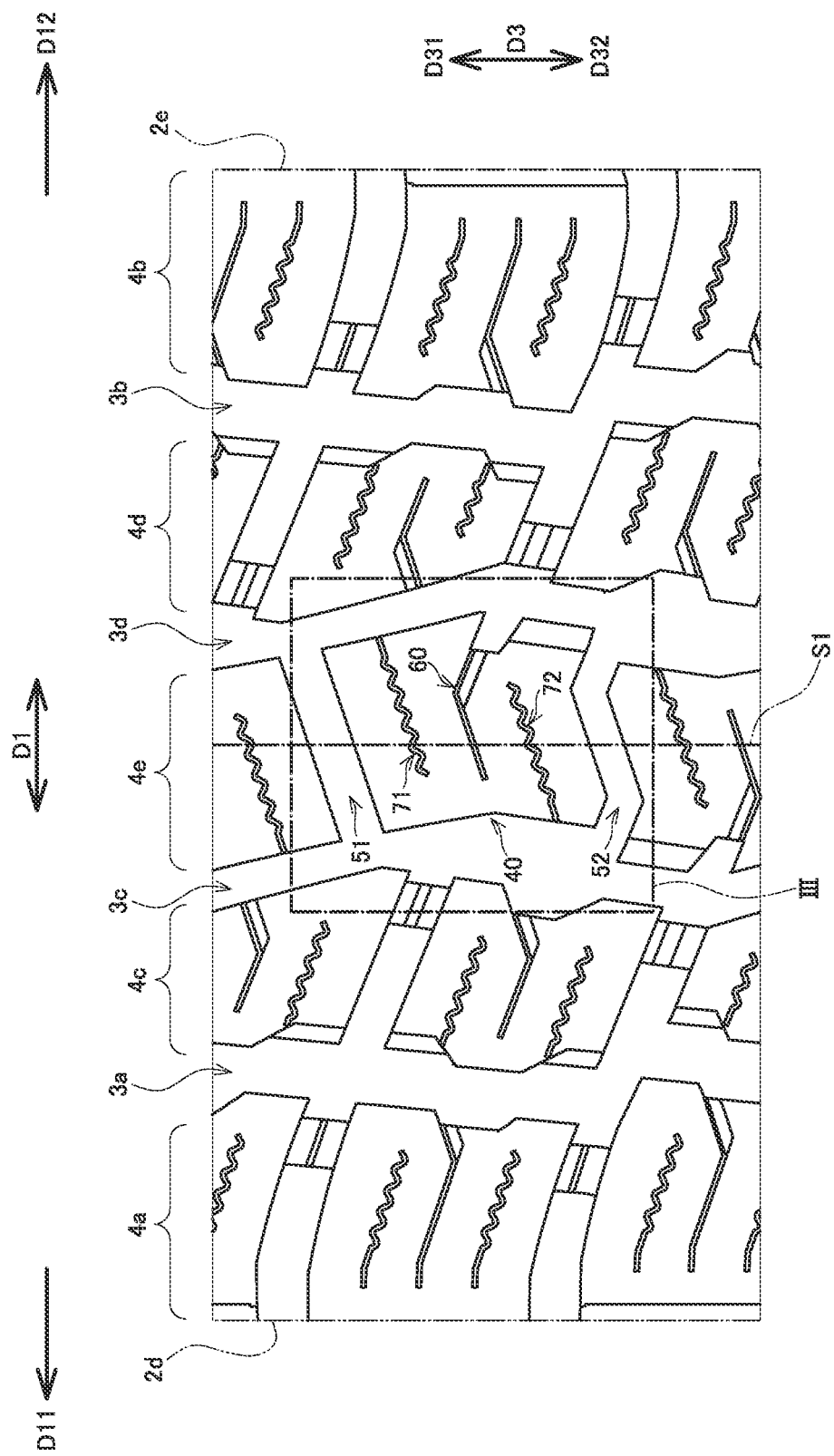
FIG. 2 is a developed view of a main part of a tread surface of the pneumatic tire according to the embodiment.

As illustrated in FIGS. 1 and 2, the tread rubber 2b includes a plurality of main grooves 3a to 3d extending in the tire circumferential direction D3. The main grooves 3a to 3d extend continuously in the tire circumferential direction D3. In the present embodiment, the main grooves 3a to 3d extend in a zigzag shape by repeating refraction along the tire circumferential direction D3, but the present invention is not limited to such a configuration. For example, at least one main groove may extend in a straight shape, or for example, at least one main groove may extend in a wave shape by repeating curvature.

The main grooves 3a to 3d may include, for example, a portion so called a tread wear indicator (not illustrated) in which the groove has been made shallow so that the degree of wear can be seen by exposure accompanied by wear. For example, the main grooves 3a to 3d may have a groove width of 3% or more of the distance (a dimension in the tire width direction D1) between the ground-contacting ends 2d, 2e. For example, the main grooves 3a to 3d may have a groove width of 5 mm or more.

The pair of main grooves 3a,3b disposed on the outermost side in the tire width direction D1 is referred to as shoulder main grooves 3a, 3b, and the main grooves 3c and 3d disposed between the pair of shoulder main grooves 3a 3b are referred to as center main grooves 3c, 3d. Although the number of the main grooves 3a to 3d is not particularly limited, the number is four in the present embodiment.

The tread rubber 2b includes a plurality of lands 4a to 4e defined by the plurality of main grooves 3a to 3d and the pair of ground-contacting ends 2d, 2e. Although the number of the lands 4a to 4e is not particularly limited, but the number is five in the present embodiment.

The lands 4a, 4b defined by the shoulder main grooves 3a, 3b and the ground-contacting ends 2d, 2e are referred to as shoulder lands 4a, 4b, and the lands 4c to 4e defined by the pair of adjacent main grooves 3a to 3d are referred to as middle lands 4c to 4e. Note that the lands 4c, 4d defined by the shoulder main grooves 3a, 3b and the center main grooves 3c, 3d are also referred to as quarter lands (also referred to as "mediate lands") 4c, 4d, and the land 4e defined by the pair of center main grooves 3c, 3d is also referred to as a center land 4e.

The center land 4e has first and second lateral grooves 51, 52 extending in a direction inclined with respect to the tire width direction D1. The first and second lateral grooves 51, 52 are connected to the main groove 3c and the main groove 3d and open to the main groove 3c and the main groove 3d. Hence the center land 4e has a plurality of center blocks 40 divided in the tire circumferential direction D3 by the first and second lateral grooves 51, 52. It can also be said that the center block 40 is defined by the main grooves 3c and 3d and the first and second lateral grooves 51, 52.

Figure 3:
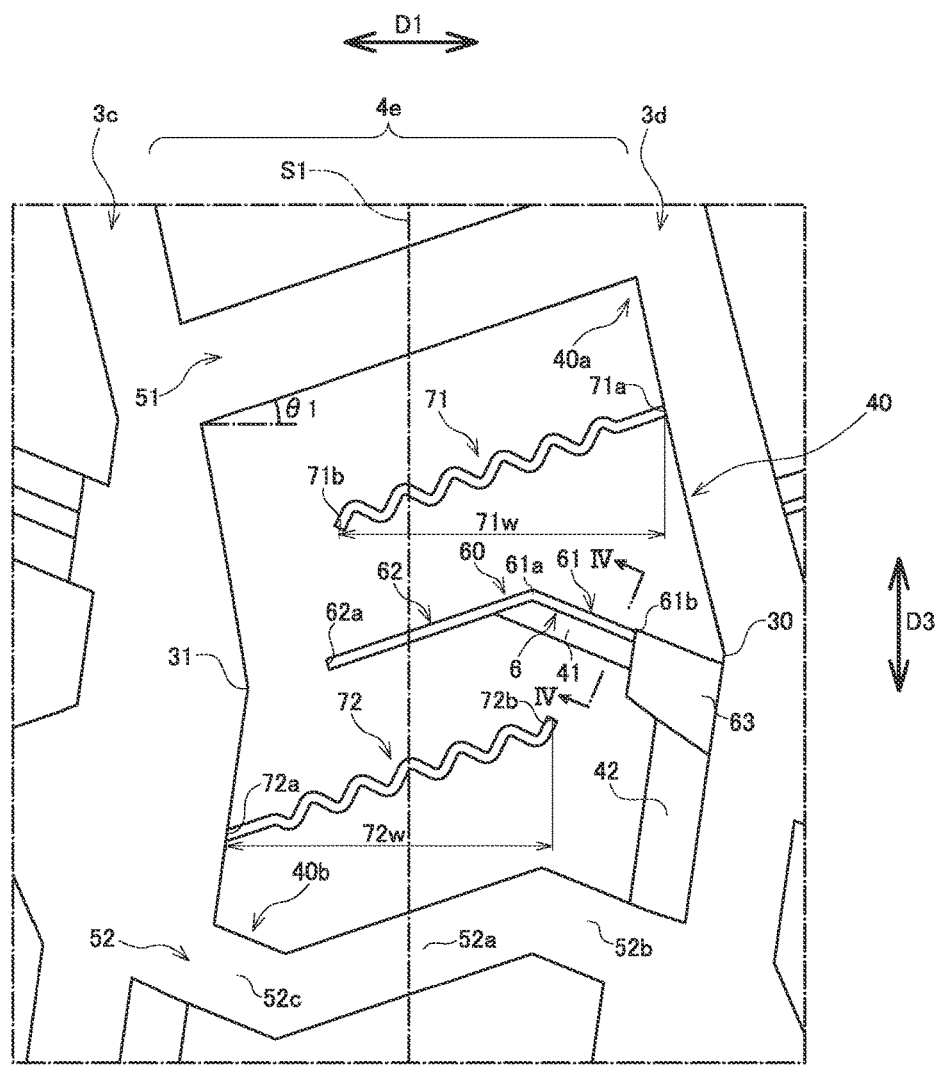
FIG. 3 is an enlarged view of a region III of the tread surface illustrated in FIG. 2.

As illustrated in FIGS. 2 and 3, the first lateral groove 51 extends straight. On the other hand, the second lateral groove 52 is refracted twice and extends in a zigzag shape. The second lateral groove 52 has a central portion 52a and first and second bent portions 52b, 52c bent and extending from both ends of the central portion 52a. The central portion 52a and the first lateral groove 51 are parallel. The first and second bent portions 52b, 52c are inclined to the side opposite to the central portion 52a with respect to the tire width direction D1. The central portion 52a is longer than the first and second bent portions 52b, 52c. Thereby, the center block 40 has a substantially parallelogram shape as a whole. Note that in the present specification, "parallel" includes not only the case of being completely parallel but also the case of being substantially parallel with an intersection angle of 5 degrees or less (the same applies hereinafter).

The center block 40 has an acute-angled first corner 40a formed by the main groove 3d (corresponding to the first main groove) and the first lateral groove 51 intersecting with each other. In addition, the center block 40 has an acute-angled second corner 40b formed by the main groove 3c (corresponding to the second main groove) and the central portion 52a of the second lateral groove 52 intersecting so as to form an acute angle. However, the second corner 40b is in the form of being chamfered by the second bent portion 52c of the second lateral groove 52.

The groove widths of the first lateral groove 51 and the second lateral groove 52 are, for example, 5.0 to 10.0 mm, and the groove widths of the first lateral groove 51 and the second lateral groove 52 of the present embodiment are 7.8 mm and 6.4 mm, respectively. The groove depths of the first lateral groove 51 and the second lateral groove 52 are, for example, 10.0 to 14.5 mm, and the groove depths of the first lateral groove 51 and the second lateral groove 52 of the present embodiment are 12.4 mm and 12.4 mm, respectively. An inclination angle θ1 of the first lateral groove 51 with respect to the tire width direction D1 is, for example, 10.0 to 25.0 degrees.

The center block 40 includes a slit 6 having one end open to the main groove 3d and the other end terminating in the center block 40. The slit 6 has a notch groove 63 open to the main groove 3d and a center sipe 60 connected to the notch groove 63.

The notch groove 63 is a groove extending from the main groove 3d toward the inside of the center block 40. The notch groove 63 is provided closer to the second lateral groove 52 than a bending point 30 of the main groove 3d. The extending direction of the notch groove 63 is parallel to the first bent portion 52b of the second lateral groove 52. Here, the extending direction of the notch groove 63 is a direction in which a groove wall closest to the first lateral groove 51 among the groove walls of the notch groove 63 extends. The groove width of the notch groove 63 is larger than the groove width of the center sipe 60. The groove depth of the notch groove 63 is 40 to 60% of the groove depth of the main grooves 3a to 3d. The groove depth of the notch groove 63 of the present embodiment is 50% of the groove depth of the main grooves 3a to 3d. By providing such a notch groove 63, drainage performance and traction performance can be improved.

One end of the center sipe 60 is open to the notch groove 63, and the other end terminates in the center block 40. The other end of the center sipe 60 is not open to the main groove 3c, whereby a decrease in the stiffness of the center block 40 due to the center sipe 60 can be reduced. The center sipe 60 has a first portion 61 extending from the notch groove 63 toward the main groove 3c, and a second portion 62 bent and extending from a terminal end 61a of the first portion 61. By providing the first portion 61 and the second portion 62 extending in different directions, an edge effect in all directions can be obtained.

The first portion 61 extends so as to be inclined in a direction opposite, with respect to the tire width direction D1, to a direction in which a first corrugated sipe 71 described later extends. The first portion 61 extends from the notch groove 63 so as to approach the first corrugated sipe 71. In addition, the first portion 61 is parallel to the first bent portion 52b of the second lateral groove 52. A starting end 61b of the first portion 61 is open to the notch groove 63.

Figure 4:
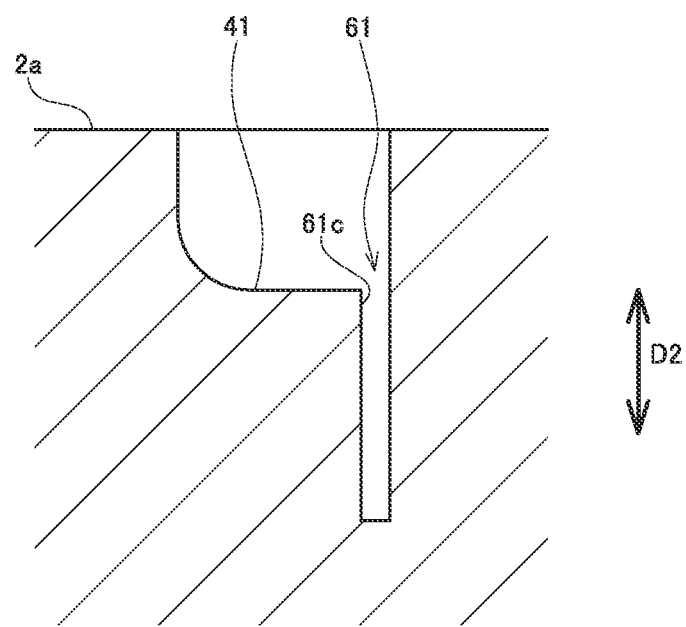
FIG. 4 is a cross-sectional view taken along a line IV-IV of the tread surface illustrated in FIG. 3.

The center block 40 has a chamfer 41 on the tread surface 2a side of the sidewall closest to the second lateral groove 52 among the sidewalls of the first portion 61. As illustrated in FIG. 4, the chamfer 41 is a recess having a substantially quadrangular cross-section obtained by cutting out a corner formed by the tread surface 2a and a sidewall 61c of the first portion 61. The depth of the chamfer 41 is, for example, 35 to 50% of the groove depth of the first portion 61. Providing the chamfer 41 increases the stiffness of the center block 40. Further, providing the chamfer 41 can also improve the drainage performance of the center sipe 60.

The second portion 62 is formed substantially at the center of the center block 40 in the tire circumferential direction D3. The second portion 62 extends across the tire equatorial plane S1. The second portion 62 extends toward a bending point 31 of the main groove 3c and is closed at the terminal end 62a in the center block 40. The second portion 62 is parallel to the first lateral groove 51 and the central portion 52a of the second lateral groove 52.

The center block 40 includes a first corrugated sipe 71 having one end open to the main groove 3d and the other end terminating in the center block 40, and a second corrugated sipe 72 having one end open to the main groove 3c and the other end terminating in the center block 40. The first corrugated sipe 71 and the second corrugated sipe 72 are disposed facing each other in the tire circumferential direction D3 across the center sipe 60.

By forming the two corrugated sipes 71, 72 so as to extend from the main grooves 3d, 3c, respectively, on both sides in the tire width direction D1, the stiffness balance of the center block 40 in the tire width direction D1 can be optimized. By optimizing the stiffness balance, for example, it is possible to decrease noise after wear while reducing irregular wear.

The amount of cutting of the center block 40 by each of the first corrugated sipe 71 and the second corrugated sipe 72 is larger than the amount of cutting by a sipe extending in a straight shape. Thus, while the edge effect is improved, the irregular wear amount also tends to become large. Therefore, by combining the center sipe 60 with the first corrugated sipe 71 and the second corrugated sipe 72, the improvement in both the edge effect and irregular wear resistance can be achieved in a well-balanced manner.

The first corrugated sipe 71 has a starting end (one end) 71a open to the main groove 3d and a terminal end (the other end) 71b closed in the center block 40. The starting end 71a is disposed closer to the acute-angled first corner 40a of the center block 40 than the center sipe 60. In other words, the first corrugated sipe 71 is open to the main groove 3d at a position closer to the acute-angled first corner 40a of the center block 40 than the center sipe 60.

The second corrugated sipe 72 has a starting end (one end) 72a open to the main groove 3c and a terminal end (the other end) 72b closed in the center block 40. The starting end 72a is disposed closer to the acute-angled second corner 40b of the center block 40 than the center sipe 60. In other words, the second corrugated sipe 72 is open to the main groove 3c at a position closer to the acute-angled second corner 40b of the center block 40 than the center sipe 60.

With these configurations, since the first corrugated sipe 71 is open to the main groove 3d at a position close to the acute-angled first corner 40a, and the second corrugated sipe 72 is open to the main groove 3c at a position close to the acute-angled second corner 40b, the difference in stiffness between the first corner 40a and the second corner 40b is small.

The first corrugated sipe 71, the second portion 62 of the center sipe 60, and the second corrugated sipe 72 are disposed at substantially equal intervals in the tire circumferential direction D3. This improves the stiffness balance in the center block 40. More specifically, the first corrugated sipe 71 extends parallel to the first lateral groove 51 and the second portion 62 of the center sipe 60. The first corrugated sipe 71 is disposed such that a distance from the first lateral groove 51 and a distance from the second portion 62 of the center sipe 60 are substantially the same. On the other hand, the second corrugated sipe 72 extends in parallel to the central portion 52a of the second lateral groove 52 and the second portion 62 of the center sipe 60. The second corrugated sipe 72 is disposed such that a distance from the central portion 52a of the second lateral groove 52 and a distance from the second portion 62 of the center sipe 60 are substantially the same. Note that the extending direction of the first corrugated sipe 71 is a direction of a straight line connecting the starting end 71a and the terminal end 71b, and the extending direction of the second corrugated sipe 72 is a direction of a straight line connecting the starting end 72a and the terminal end 72b.

The first corrugated sipe 71 and the second corrugated sipe 72 extend across the tire equatorial plane S1. The length of the first corrugated sipe 71 and the length of the second corrugated sipe 72 are preferably the same. This further improves the stiffness balance in the center block 40.

The length of the first corrugated sipe 71 is preferably 50 to 80% of the width of the center block 40 in the extending direction of the first corrugated sipe 71 in a portion where the first corrugated sipe 71 is formed. When the length is less than 50%, the edge effect by the first corrugated sipe 71 is weakened, and when the length is more than 80%, the decrease in the stiffness of the center block 40 due to the first corrugated sipe 71 increases.

The length of the second corrugated sipe 72 is preferably 50 to 80% of the width of the center block 40 in the extending direction of the second corrugated sipe 72 in a portion where the second corrugated sipe 72 is formed. When the length is less than 50%, the edge effect of the second corrugated sipe 72 is weakened, and when the length is more than 80%, the decrease in the stiffness of the center block 40 due to the second corrugated sipe 72 increases.

The first corrugated sipe 71 partially overlaps the second corrugated sipe 72 when viewed in the tire circumferential direction D3. When viewed in the tire circumferential direction, the first corrugated sipe 71 preferably overlaps the second corrugated sipe 72, in a width, by 50% or more of a width 72w of the second corrugated sipe 72 in the tire width direction D1 and more preferably overlaps the second corrugated sipe 72, in the width, by 70% or more of the width 72w of the second corrugated sipe 72 in the tire width direction D1. Similarly, when viewed in the tire circumferential direction, the second corrugated sipe 72 preferably overlaps the first corrugated sipe 71, in a width, by 50% or more of the width 71w of the first corrugated sipe 71 in the tire width direction D1 and more preferably overlaps the first corrugated sipe 71, in the width, by 70% or more of the width 71w of the first corrugated sipe 71 in the tire width direction D1. As a result, the lengths of the first corrugated sipe 71 and the second corrugated sipe 72 can be ensured, and hence a sufficient edge effect can be obtained. When viewed in the tire circumferential direction D3, the terminal end 71b of the first corrugated sipe 71 and the terminal end 62a of the center sipe 60 overlap each other.

In the present specification, the "sipe" means a groove having a width dimension of less than 1.6 mm on the tread surface 2a. In the present embodiment, the center sipe 60, the first corrugated sipe 71, and the second corrugated sipe 72 have groove widths of 0.4 to 1.2 mm. The groove widths of the center sipe 60, the first corrugated sipe 71, and the second corrugated sipe 72 are 5 to 20% of the groove widths of the main grooves 3a to 3d.

The groove depths of the center sipe 60, the first corrugated sipe 71, and the second corrugated sipe 72 are 40 to 60% of the groove depth of the main grooves 3a to 3d. In the present embodiment, the groove depth of the center sipe 60, the first corrugated sipe 71, and the second corrugated sipe 72 is 5.2 to 7.0 mm.

The center block 40 has an inclined surface 42 inclined inward in the tire radial direction D2 toward the main groove 3d between the notch groove 63 and the second lateral groove 52. Providing the inclined surface 42 increases the stiffness of the center block 40.

As described above, the pneumatic tire 1 according to the present embodiment includes: a first main groove 3d and a second main groove 3c that are extending in a tire circumferential direction D3; a first lateral groove 51 and a second lateral groove 52 that are extending in a direction inclined with respect to the tire width direction D1, and connected to the first main groove 3d and the second main groove 3c; and a block 40 defined by the first main groove 3d and the second main groove 3c and the first lateral groove 51 and the second lateral groove 52. The block 40 includes a slit 6 that has one end open to the first main groove 3d and the other end 62a terminating in the block 40, a first corrugated sipe 71 that has one end 71a open to the first main groove 3d and the other end 71b terminating in the block 40, and a second corrugated sipe 72 that has one end 72a open to the second main groove 3c and the other end 72b terminating in the block 40. The slit 6 includes a notch groove 63 open to the first main groove 3d, and a center sipe 60 connected to the notch groove 63. The center sipe 60 includes a first portion 61 extending from the notch groove 63 toward the second main groove 3c, and a second portion 62 bent and extending from a terminal end 61a of the first portion 61. The first corrugated sipe 71 and the second corrugated sipe 72 are disposed in the tire circumferential direction D3 across the center sipe 60.

By extending the first corrugated sipe 71 and the second corrugated sipe 72 from the first main groove 3d and the second main groove 3c, respectively, to the opposite sides, the stiffness balance of the block 40 in the tire width direction D1 can be optimized.

In the pneumatic tire 1 according to the present embodiment, when viewed in the tire circumferential direction D3, the first corrugated sipe 71 overlaps the second corrugated sipe 72, in the width, by 50% or more of the width 72w of the second corrugated sipe 72.

With this configuration, since the lengths of the first corrugated sipe 71 and the second corrugated sipe 72 can be ensured, a sufficient edge effect can be obtained.

In the pneumatic tire 1 according to the present embodiment, the notch groove 63 is wider than the groove width of the center sipe 60.

With this configuration, drainage performance and traction performance can be improved.

In the pneumatic tire 1 according to the present embodiment, the block 40 includes an acute-angled first corner 40a formed by the first main groove 3d and the first lateral groove 51 intersecting with each other, and an acute-angled second corner 40b formed by the second main groove 3c and a central portion 52a of the second lateral groove 52 intersecting with each other so as to form an acute angle. The first corrugated sipe 71 is open to the first main groove 3d at a position closer to the acute-angled first corner 40a than the center sipe 60, and the second corrugated sipe 72 is open to the second main groove 3c at a position closer to the second corner 40b than the center sipe 60.

With these configurations, the first corrugated sipe 71 is open to the main groove 3d at a position close to the acute-angled first corner 40a, while the second corrugated sipe 72 is open to the main groove 3c at a position close to the acute-angled second corner 40b, so that the difference in stiffness between the first corner 40a and the second corner 40b is small.

In the pneumatic tire 1 according to the present embodiment, the first portion 61 of the center sipe 60 extends from the notch groove 63 in a direction opposite, with respect to a tire width direction D1, to a direction in which the first corrugated sipe 71 extends, and a second portion 62 of the center sipe 60 is parallel to the first corrugated sipe 71 and the second corrugated sipe 72.

By making the second portion 62 parallel to the first corrugated sipe 71 and the second corrugated sipe 72, the stiffness balance in the center block 40 is improved. In addition, by forming the first portion 61 in a direction from the first main groove 3d toward the first corrugated sipe 71, the interval between the opening (starting end 61b) of the center sipe 60 and the opening (starting end 71a) of the first corrugated sipe 71 can be widened, so that a decrease in the stiffness of the center block 40 can be reduced.

Note that the pneumatic tire 1 is not limited to the configuration of the embodiment described above or is not limited to the operation and effect described above. It is needless to say that various modifications can be made to the pneumatic tire 1 within a range not departing from the gist of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

(1) In the pneumatic tire 1 according to the above embodiment, when viewed in the tire circumferential direction D3, the first corrugated sipe 71 overlaps the second corrugated sipe 72, in the width, by 50% or more of the width 72w of the second corrugated sipe 72. However, the pneumatic tire 1 is not limited to such a configuration. For example, when viewed in the tire circumferential direction D3, the first corrugated sipe 71 may overlap the second corrugated sipe 72, in the width, by less than 50% of the width 72w of the second corrugated sipe 72.

(2) In the pneumatic tire 1 according to the above embodiment, the notch groove 63 is wider than the groove width of the center sipe 60. However, the pneumatic tire 1 is not limited to such a configuration. For example, the notch groove 63 may have the same groove width as the center sipe 60.

(3) In the pneumatic tire 1 according to the above embodiment, the block 40 includes the acute-angled first corner 40a formed by the first main groove 3d and the first lateral groove 51 intersecting with each other, and the acute-angled second corner 40b formed by the second main groove 3c and the central portion 52a of the second lateral groove 52 intersecting with each other so as to form an acute angle. The first corrugated sipe 71 is open to the first main groove 3d at a position closer to the acute-angled first corner 40a than the center sipe 60, and the second corrugated sipe 72 is open to the second main groove 3c at a position closer to the second corner 40b than the center sipe 60. However, the pneumatic tire 1 is not limited to such a configuration. For example, the block 40 may have an obtuse corner formed by the first main groove 3d and the first lateral groove 51 intersecting each other, and the first corrugated sipe 71 may be open to the first main groove 3d at a position closer to the acute-angled first corner 40a than the center sipe 60.

(4) In the pneumatic tire 1 according to the above embodiment, the first portion 61 of the center sipe 60 extends from the notch groove 63 in a direction opposite, with respect to a tire width direction D1, to a direction in which the first corrugated sipe 71 extends, and the second portion 62 of the center sipe 60 is parallel to the first corrugated sipe 71 and the second corrugated sipe 72. However, the pneumatic tire 1 is not limited to such a configuration. For example, the second portion 62 of the center sipe 60 may not be parallel to the first corrugated sipe 71 and the second corrugated sipe 72.

(5) In the pneumatic tire 1 according to the above embodiment, the center land 4e includes a block defined by the first and second main grooves and the first and second lateral grooves, the block includes the slit 6, the first corrugated sipe 71, and the second corrugated sipe 72, the slit 6 has the notch groove 63 open to the first main groove and the center sipe 60 connected to the notch groove 63, the center sipe 60 has the first portion 61 extending from the notch groove 63 toward the second main groove and the second portion 62 bent and extending from the terminal end 61a of the first portion 61, and the first corrugated sipe 71 and the second corrugated sipe 72 are disposed in the tire circumferential direction D3 across the center sipe 60. However, the pneumatic tire 1 is not limited to such a configuration. For example, the quarter lands 4c, 4d may include a block defined by the first and second main grooves and the first and second lateral grooves, the block may include the slit 6, the first corrugated sipe 71, and the second corrugated sipe 72, the slit 6 may have the notch groove 63 open to the first main groove and the center sipe 60 connected to the notch groove 63, the center sipe 60 may have the first portion 61 extending from the notch groove 63 toward the second main groove and the second portion 62 bent and extending from the terminal end 61a of the first portion 61, and the first corrugated sipe 71 and the second corrugated sipe 72 may be disposed in the tire circumferential direction D3 across the center sipe 60.

What is claimed is:

1. A pneumatic tire comprising:
    first and second main grooves that are extending in a tire circumferential direction;
    first and second lateral grooves that are extending in a direction inclined with respect to a tire width direction and are connected to the first and second main grooves; and
    a block defined by the first and second main grooves and the first and second lateral grooves,
    wherein the block includes
        a slit that has one end open to the first main groove and the other end terminating in the block,
        a first corrugated sipe that has one end open to the first main groove and the other end terminating in the block, and
        a second corrugated sipe that has one end open to the second main groove and the other end terminating in the block,
    wherein the slit includes
        a notch groove open to the first main groove, and
        a center sipe connected to the notch groove,
    wherein the center sipe includes
        a bend,
        a first portion extending from the notch groove at a first angle relative to the tire width direction and having a terminal end at the bend, and
        a second portion extending from the terminal end of the first portion at a second angle relative the tire width direction that is different from the first angle, the second portion being parallel to the first corrugated sipe and the second corrugated sipe, and
    wherein the first corrugated sipe and the second corrugated sipe are disposed in the tire circumferential direction across the center sipe.

2. The pneumatic tire according to claim 1, wherein the first corrugated sipe overlaps the second corrugated sipe, in a width, by 50% or more of a width of the second corrugated sipe when viewed in the tire circumferential direction.

3. The pneumatic tire according to claim 1, wherein a groove width of the notch groove is larger than a groove width of the center sipe.

4. The pneumatic tire according to claim 1,
    wherein the block includes
        an acute-angled first corner formed by the first main groove and the first lateral groove intersecting with each other so as to form an acute angle, and
        an acute-angled second corner formed by the second main groove and an extension line of a central portion of the second lateral groove intersecting with each other so as to form an acute angle, and
    wherein the first corrugated sipe is open to the first main groove at a position closer to the first corner than the center sipe, and the second corrugated sipe is open to the second main groove at a position closer to the second corner than the center sipe.

5. The pneumatic tire according to claim 1, wherein the first corrugated sipe, the second portion of the center sipe, and the second corrugated sipe are disposed at equal intervals in the tire circumferential direction.

6. The pneumatic tire according to claim 1, wherein
    the first lateral groove extends in a straight shape, and the second lateral groove extends in a zigzag shape, and the second lateral groove has a central portion parallel to the first lateral groove and has first and second bent portions bent and extending from both ends of the central portion.

7. The pneumatic tire according to claim 1, wherein the block has a chamfer on a tread surface side of a sidewall closest to the second lateral groove among sidewalls of the first portion.

8. A pneumatic tire comprising:
first and second main grooves that are extending in a tire circumferential direction;
first and second lateral grooves that are extending in a direction inclined with respect to a tire width direction and are connected to the first and second main grooves; and
a block defined by the first and second main grooves and the first and second lateral grooves,
wherein the block includes
    a slit that has one end open to the first main groove and the other end terminating in the block,
    a first corrugated sipe that has one end open to the first main groove and the other end terminating in the block, and
    a second corrugated sipe that has one end open to the second main groove and the other end terminating in the block,
wherein the slit includes
    a notch groove open to the first main groove, and
    a center sipe connected to the notch groove,
wherein the center sipe includes
    a first portion extending from the notch groove toward the second main groove, and
    a second portion extending from a terminal end of the first portion,
wherein the first corrugated sipe and the second corrugated sipe are disposed in the tire circumferential direction across the center sipe,
wherein the first lateral groove extends in a straight shape and the second lateral groove extends in a zigzag shape,
wherein the second lateral groove has a central portion parallel to the first lateral groove and has first and second bent portions bent and extending from both ends of the central portion, and
wherein the second portion is parallel to the first lateral groove and the central portion of the second lateral groove.

\* \* \* \* \*